Jan. 9, 1923.　　　　　　　　　　　　　　　　　　　　　　1,441,554.
C. H. BISSELL.
LAMP GUARD ATTACHMENT FOR CONDUIT OUTLET BOXES.
FILED JULY 15, 1918.

INVENTOR
Carl H. Bissell
BY
Parsons & Bodell
ATTORNEYS.

Patented Jan. 9, 1923.

1,441,554

UNITED STATES PATENT OFFICE.

CARL H. BISSELL, OF SYRACUSE, NEW YORK, ASSIGNOR TO CROUSE-HINDS COMPANY, OF SYRACUSE, NEW YORK, A CORPORATION OF NEW YORK.

LAMP-GUARD ATTACHMENT FOR CONDUIT OUTLET BOXES.

Application filed July 15, 1918. Serial No. 244,882.

*To all whom it may concern:*

Be it known that I, CARL H. BISSELL, a citizen of the United States, and a resident of Syracuse, in the county of Onondaga and State of New York, have invented a certain new and useful Lamp-Guard Attachment for Conduit Outlet Boxes, of which the following is a specification.

This invention has for its object a particularly simple and efficient means for attaching an incandescent electric lamp and guard therefor to a conduit outlet box and the invention consists in the novel features and in the combinations and constructions hereinafter set forth and claimed.

In describing this invention, reference is had to the accompanying drawings in which like characters designate corresponding parts in all the views.

Figures 1, 2, 3:
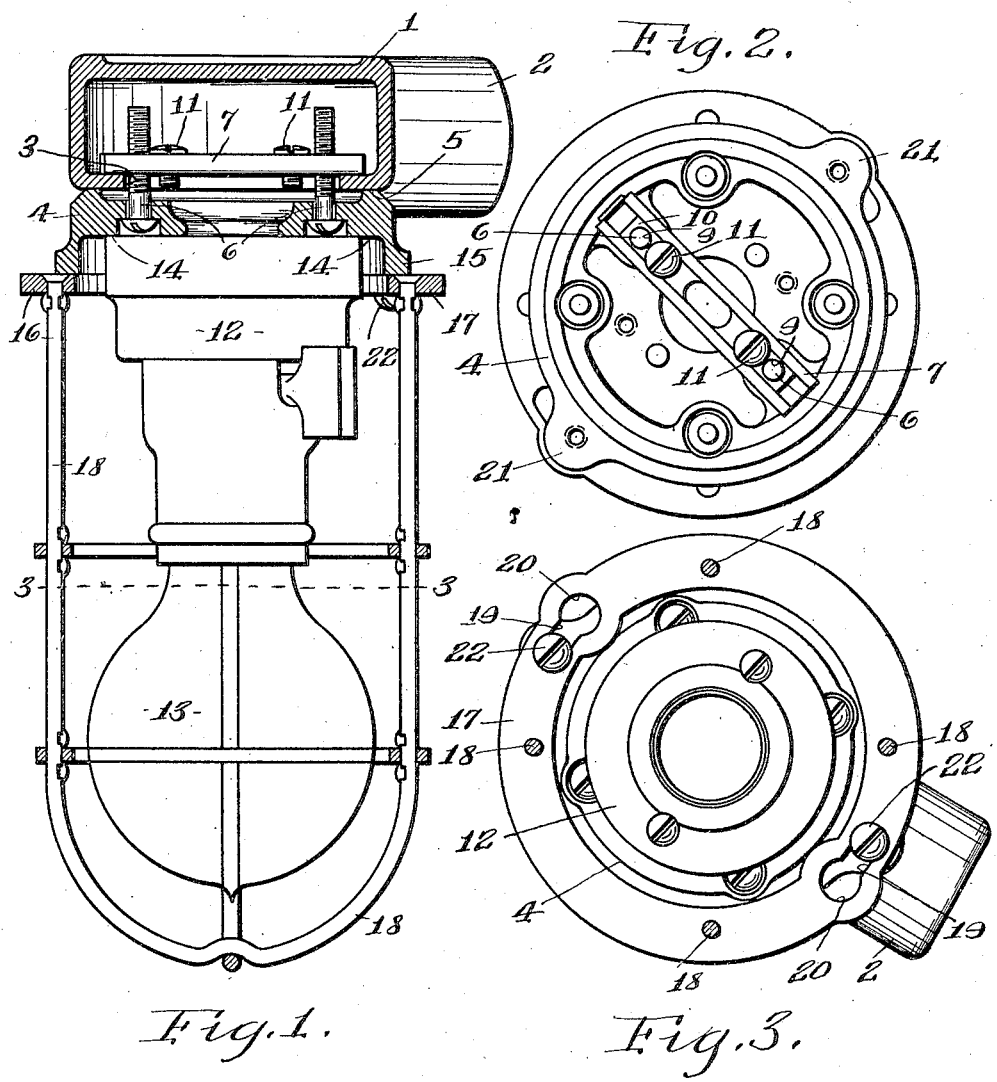
Figure 1 is a longitudinal sectional view, partly in elevation, of a conduit outlet box provided with my invention.
Figure 2 is a plan view of the ring shaped member attachable to the conduit outlet box for supporting the guard for the lamp, the means by which said member is attached to the conduit outlet box being also shown.
Figure 3 is a sectional view taken on the plane of line 3—3, Fig. 1, looking upwardly, the lamp being omitted.

This invention comprises, generally, a member mountable upon the open side of a conduit outlet box which has an opening in one side thereof, means for connecting said member to the open side of the box through the opening in said side, and means for detachably connecting to said member a lamp guard enclosing the lamp socket and the lamp mountable on said member.

1 designates the conduit outlet box which may be of any suitable, form size and construction, the same being here shown as including a body having a nipple 2 for connection to an electric conduit and an opening 3 in one side thereof.

4 designates the member for supporting the lamp and the guard, this member being in the form of a ring mounted on the margin 5 of the wall around the opening 2.

The member 4 is here shown as connected to the open side of the box 1 by means of screws 6 extending through the member 4 and through the opening 3 in the box 1 and into a cross bar 7 extending diametrically across the opening 3 and having its ends 8 clamped by the screws against the inner face of the margin 5 around the opening 3. The means for holding the member 4 to the conduit outlet box per se forms no part of this invention. Said means are usually employed to secure the bases of electrical appliances directly to the conduit outlet box, these bases having screws which enter into holes 9 provided in slides 10 which are held in any adjusted position lengthwise of the bar 8 by means of clamping the screws 11.

12 is a lamp socket, and 13 the lamp in said socket, the socket being secured to the ring shaped member 4 in any suitable manner as a screw threading in said member. The socket 12 seats on an internal surface 14 of the ring shaped member and said ring has an annular flange 15 projecting in front of said surface 14 and surrounding the base of the socket.

16 designates the guard which includes a base flange 17 mountable upon the front face of the flange 15 and a cage carried by the base flange 17 and including lengthwise members or rods 18 riveted or otherwise secured to the ring 17.

The ring 17 is detachably secured to the member 4 in any suitable manner and as here shown it is formed with slots 19 arranged diametrically opposite each other and provided with enlargements 20 at like ends and the member 4 is provided with laterally extending ears 21 overlying the slots and with studs as screws 22 extending through the slots 19.

Upon loosening of the screws and a slight rotation of the ring 17, the heads of the screws 22 are brought into alinement with the enlargements 20 so that the guard can be removed. The guard is placed in position by the reverse of these movements.

My invention is particularly advantageous in that it provides a particularly simple and efficient means for mounting an electric lamp and the guard therefor on a conduit outlet box.

What I claim is:

The combination of a conduit outlet box having an opening in one side and a bearing face around the opening, a ring shaped member mounted on the bearing face, means for securing the ring shaped member on the box including a part lapping the inner face of the margin of the wall around the opening in the open side and interlocking therewith and a fastening element extending through the ring shaped member and the opening in said open side and connected to said part, a lamp socket mounted on the ring shaped member, and a guard also mounted on the ring shaped member, substantially as and for the purpose described.

In testimony whereof, I have hereunto signed my name, at Syracuse, in the county of Onondaga, and State of New York, this 12th day of July, 1918.

CARL H. BISSELL.